2 Sheets—Sheet 1.

R. F. SCANNELL & J. E. LIPSCOMBE.
Filter.

No. 226,249. Patented April 6, 1880.

WITNESSES
Jas. W. Reid Jr.
John M. Robertson

INVENTORS
Roger F. Scannell
John E. Lipscombe
By their Att'y.
Henry W. Williams

N. PETERS, PHOTO-LITHOGRAPHER, WASHINGTON, D.C.

2 Sheets—Sheet 2.

R. F. SCANNELL & J. E. LIPSCOMBE.
Filter.

No. 226,249. Patented April 6, 1880.

WITNESSES
Jas. H. Reed Jr.
John M. Robertson

INVENTORS
Roger F. Scannell
John E. Lipscombe
By their Att'y.
Henry W. Williams

UNITED STATES PATENT OFFICE.

ROGER F. SCANNELL AND JOHN E. LIPSCOMBE, OF BOSTON, MASS.

FILTER.

SPECIFICATION forming part of Letters Patent No. 226,249, dated April 6, 1880.

Application filed December 8, 1879.

*To all whom it may concern:*

Be it known that we, ROGER F. SCANNELL and JOHN E. LIPSCOMBE, both of Boston, in the county of Suffolk and State of Massachusetts, have invented a new and useful Improvement in Filters, of which the following is a specification.

The main use of this filter is to purify water, although it may be used in connection with other liquids, if desired.

This is a reversible filter, constructed as below set forth, and so arranged that by means of a single faucet the water may be filtered, or by reversing it the filter may be cleared out, or the water may pass through unfiltered, all of which is indicated and regulated by a hand and dial.

Figure 1:
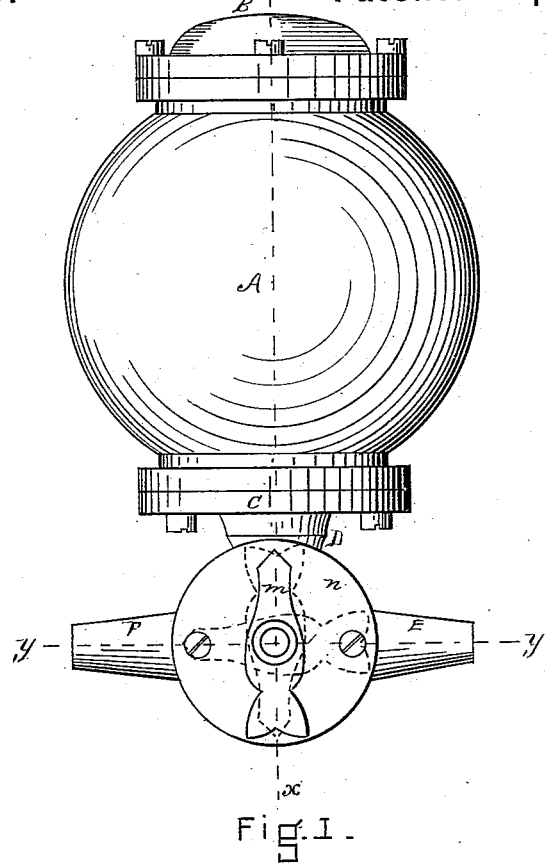
Figure 2:
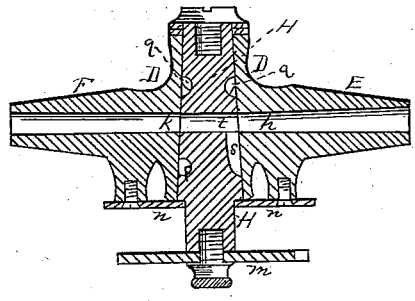
Figure 3:
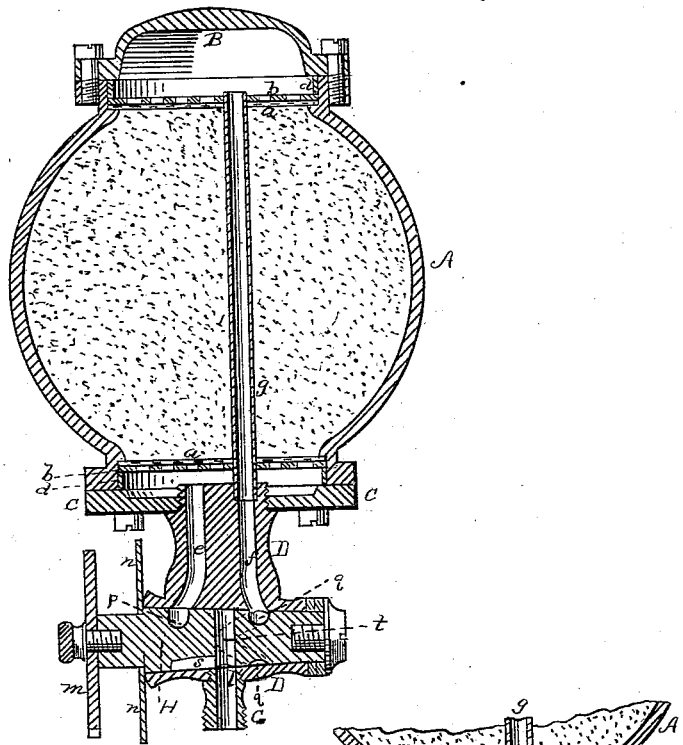
Figure 4:
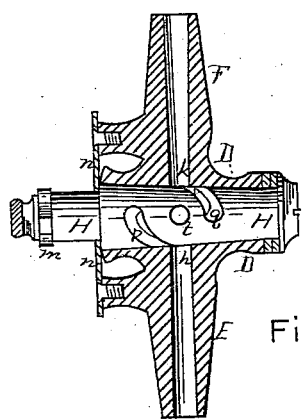
Figure 5:
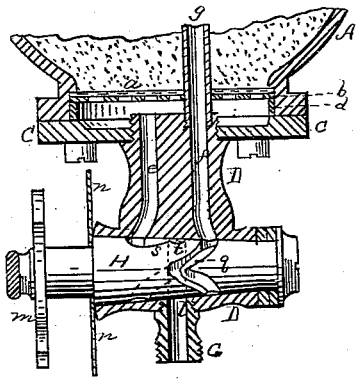

In the accompanying drawings, in which similar letters of reference indicate like parts, Figure 1 is a front elevation of a filter embodying our invention, with the hand indicating that it is in position to act as a filter and purify the water. Fig. 2 is a horizontal section upon line $y\,y$, Fig. 1, with hand pointing toward the left, thus allowing the water to pass through unfiltered. Fig. 3 is a vertical section on line $x\,x$, Fig. 1, with the faucet or cock in position to filter. Fig. 4 is a horizontal section, showing the plug in plan in the same position as shown in Figs. 1 and 3. Fig. 5 is a vertical section with the dial pointing downward and the cock reversed, so as to cleanse the filter.

A is a chamber containing charcoal or other suitable substance or compound, such charcoal being held in place by wire-gauze $a\,a$ above and below, which gauze is supported by perforated plates $b\,b$. B and C are, respectively, the top and bottom plates closing the chamber, and the perforated plates $b\,b$ are kept from becoming loose and lying against the plates B C by means of rings or guards $d\,d$.

D is the faucet or cock, provided with passages leading as follows: Passage $e$ leads to the carbon-chamber; passage $f$ leads to a vertical tube, $g$, which passes through the carbon-chamber and opens above the gauze $a$ and perforated plate $b$, but does not extend far enough to meet the upper plate, B; passage $h$ leads to the supply-pipe E; passage $k$ leads to the house-pipe F; passage $l$ leads to the waste-pipe G, and all the said passages connect with the plug.

H is the plug, having the hand or pointer $m$ fixed to its forward end and passing through the dial $n$, which is secured to the faucet. The plug H is provided with the grooves or channels $p$, $q$, and $s$, of the peculiar shape shown, and the hole $t$.

The filter operates as follows: When it is desired to filter the water the hand $m$ is placed so as to point up, as in Figs. 1, 3, and 4. The water flows in through passage $h$ in pipe E, passes from passage $h$ into passage $p$ in the plug, which allows it to pass into passage $e$ through the carbon-chamber, and down again, through tube $g$ and passage $f$, into plug-passage $q$, which takes it into passage $k$, and thence through pipe F to be consumed.

To cleanse the filter, reverse the hand $m$, (which turns the plug H,) as seen in Fig. 5. The water, passing through passage $h$ in pipe E, passes through channel $q$ into passage $f$, thence through tube $g$ above the carbon, then down through it into passage $e$, thence into channel $s$, conducting to hole $t$, and through it out through hole $l$ in waste-pipe G.

To allow the water to pass through unfiltered, turn the hand so as to point toward house-pipe F, and the water passes from passage $h$ in supply-pipe E, through hole $t$ in plug, into passage $k$ in house-pipe F, as in Fig. 2.

Thus it will be seen that with a single cock the water may pass through filtered or unfiltered, or the filter be cleansed by reversing, and these by means of an indicator so simple that a child can understand and operate it.

Having thus fully described our invention, what we claim, and desire to secure by Letters Patent, is—

1. The combination of the chamber A, provided with the vertical tube $g$, the faucet or cock D, provided with the passages $e\ f$ and waste-pipe G, and the plug H, having the peculiarly-shaped channels $p\ q\ s$, hole $t$, and indicator $m$, all constructed and arranged substantially as and for the purposes specified.

2. The combination of the plug H, provided with the channels $p\ q\ s$ and hole $t$, with the faucet D, provided with the waste-pipe G and supply and house pipes E F, substantially as described.

3. The combination of the faucet or cock D, provided with the internal tubes or passages, $e\ f$, the former arranged to communicate directly with the carbon-chamber and the latter with the tube $g$, and thence to the carbon-chamber, the tube $g$ placed entirely within the filter, and the plug H, provided with the channel $s$, the diagonal channel $p$, and the V-shaped channel $q$, arranged as described, and for the purposes specified.

ROGER F. SCANNELL.
JOHN E. LIPSCOMBE.

Witnesses:
 HENRY W. WILLIAMS,
 JAS. W. REED, Jr.